(12) United States Patent
Janakiraman

(10) Patent No.: US 9,729,337 B2
(45) Date of Patent: Aug. 8, 2017

(54) DELIVERING AND MANAGING MULTICAST TRAFFIC OVER WIRELESS LANS

(75) Inventor: Ramsundar Janakiraman, Sunnyvale, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 1185 days.

(21) Appl. No.: 12/947,652

(22) Filed: Nov. 16, 2010

(65) Prior Publication Data
US 2012/0106547 A1  May 3, 2012

Related U.S. Application Data

(63) Continuation-in-part of application No. 12/916,273, filed on Oct. 29, 2010, now abandoned.

(51) Int. Cl.
*H04L 12/18* (2006.01)
*H04B 7/155* (2006.01)
*H04L 1/00* (2006.01)

(52) U.S. Cl.
CPC ......... *H04L 12/1836* (2013.01); *H04B 7/155* (2013.01); *H04L 1/00* (2013.01); *H04L 12/185* (2013.01); *H04L 12/189* (2013.01); *H04L 2201/00* (2013.01)

(58) Field of Classification Search
CPC . H04L 12/1836; H04L 12/185; H04L 12/189; H04L 1/00; H04L 2201/00; H04B 7/155
USPC .................. 370/311, 312, 331, 390
See application file for complete search history.

(56) References Cited

U.S. PATENT DOCUMENTS

| | | | |
|---|---|---|---|
| 8,199,689 B2* | 6/2012 | Maltseff et al. | 370/312 |
| 2003/0158982 A1* | 8/2003 | Sadowsky | G09G 5/395 710/107 |
| 2004/0158872 A1* | 8/2004 | Kobayashi | H04L 12/1886 725/120 |
| 2004/0264463 A1* | 12/2004 | Fukushima et al. | 370/390 |
| 2005/0018678 A1* | 1/2005 | Keller | H04L 12/189 370/390 |
| 2005/0249213 A1* | 11/2005 | Higuchi et al. | 370/390 |
| 2006/0098613 A1* | 5/2006 | Kish | H04N 21/6405 370/338 |
| 2007/0168555 A1* | 7/2007 | Dorenbosch | H04L 12/189 709/245 |

(Continued)

OTHER PUBLICATIONS

Jon Hardwich, "IP Multicast Explained", Jun. 2004, Metaswitch, pp. 1-68.*

(Continued)

*Primary Examiner* — Ian N Moore
*Assistant Examiner* — Mewale Ambaye
(74) *Attorney, Agent, or Firm* — Brooks, Cameron & Huebsch, PLLC

(57) ABSTRACT

Processing of MLD control packets in an access point (AP) connected to a digital network. According to the present invention, an AP in a network converts MLD queries from multicast to unicast and sends these unicast packets to each client of the AP. These MLD query packets may be filtered or restricted by per-user client rules These MLD query packets may also be tagged as high priority packets to speed their delivery. The AP also suppresses the retransmission of MLD Join packets to clients of the AP.

15 Claims, 1 Drawing Sheet

(56) References Cited

U.S. PATENT DOCUMENTS

| | | | | |
|---|---|---|---|---|
| 2008/0168241 | A1* | 7/2008 | Raghavan | 711/158 |
| 2008/0232373 | A1* | 9/2008 | Iyer | H04L 12/189 |
| | | | | 370/392 |
| 2009/0016345 | A1* | 1/2009 | Tsuchiya et al. | 370/390 |
| 2009/0147718 | A1* | 6/2009 | Liu et al. | 370/312 |
| 2010/0107162 | A1* | 4/2010 | Edwards | G06F 9/5077 |
| | | | | 718/1 |
| 2011/0103284 | A1* | 5/2011 | Gundavelli et al. | 370/312 |
| 2011/0110286 | A1* | 5/2011 | Lu | H04L 12/185 |
| | | | | 370/312 |
| 2011/0252439 | A1* | 10/2011 | Lai | H04N 21/43637 |
| | | | | 725/25 |
| 2015/0036584 | A1* | 2/2015 | Ushiki | H04L 67/16 |
| | | | | 370/315 |

OTHER PUBLICATIONS

Jon et al. "IP multicast explain" Jun. 24, 2004. England.*
Cisco et al. "Multicast Listener Discovery (MLD) for IPv6" Oct. 1999, 22 pages.*
U.S. Appl. No. 12/916,273, Non-Final Office Action, mailed Aug. 6, 2012.
Jon Hardship, "IP Multicast explained", Jun. 2004, Metaswitch, pp. 1-68.

\* cited by examiner

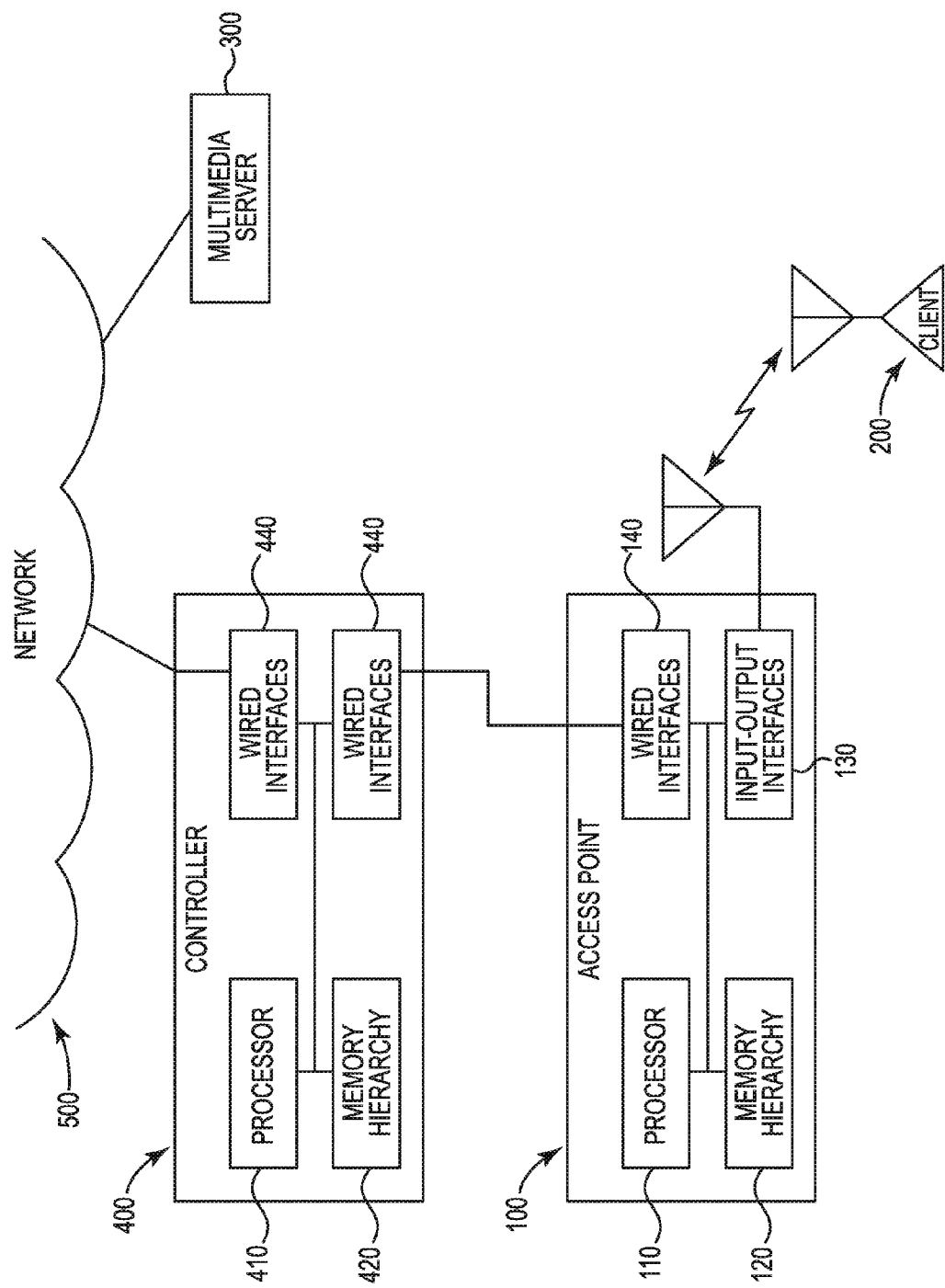

DELIVERING AND MANAGING MULTICAST TRAFFIC OVER WIRELESS LANS

CROSS REFERENCE TO RELATED APPLICATION

This application is a continuation-in-part of U.S. application Ser. No. 12/916,273, filed Oct. 29, 2010, the entire contents of which are incorporated by reference.

BACKGROUND OF THE INVENTION

The present invention relates to digital networks, and in particular, to delivering and managing multicast traffic over wireless local area networks.

Digital networks have rapidly become the backbone of many enterprises, small and large. Such networks are used for handling many different kinds of traffic. One type of traffic becoming increasingly important is Multicast traffic, which is used to carry media streams such as video, among others.

Multicast by definition is traffic sent from one source to multiple destinations. As an example, if twenty users subscribe to the same video stream, only one multicast stream is transmitted from a media server through the network to multiple destination, rather than twenty separate unicast streams.

Protocols such as IGMP and MLD are known in the art for managing multicast membership in IPV4 and IPV6 networks respectively. These protocols for managing multicast membership in the network, rely upon reliable delivery of the underlying multicast packets. Where IGMP is a separate protocol in the IPv4 world, MLD is a component of the IPv6 suite. MLDv1 is similar to IGMPv2, and MLDv2 is similar to IGMPv3. MLD is described in RFC 3810.

Wireless networks, and multicast distribution over wireless networks such as wireless local area networks (WLANs) introduce a host of new problems to multicast distribution. On the wired network, all packets travel at the same speed, and the CSMA/CD nature of wired Ethernet networks carries with it a high degree of reliability. On WLANs, however, multicast packets are sent at much lower data rates, in comparison to unicast packets, to help insure delivery. Multicast packets are also sent using UDP, a connectionless protocol, with limited error recovery mechanisms.

Many WLAN systems deliver multicast traffic over WLANs by converting the multicast packets to unicast at Layer 2, such as at an access point (AP). While this allows the converted multicast packets to be transmitted at much higher data rates, issues still exist with respect to MLD control-plane traffic such as Joins and Queries.

Inconsistent IPV6 multicast group membership, as an example, results in multicast to unicast conversions not happening for interested clients, or wasted bandwidth in sending multicast streams to clients that are not interested in the multicast group.

What is needed is a way to improve handling of packets related to Multicast membership management protocols like MLD in wireless portions of a network.

BRIEF DESCRIPTION OF THE DRAWINGS

The invention may be best understood by referring to the following description and accompanying drawings that are used to illustrate embodiments of the invention in which:

FIG. 1 shows clients in a network.

DETAILED DESCRIPTION

Embodiments of the invention relate to methods of handling MLD protocol packets by controllers and/or wireless access points (APs) in a digital network that supports Internet Protocol Version 6.

According to the present invention, a device in a network such as a controller or an AP converts permitted MLD (or IGMP) queries from multicast to unicast and sends these unicast packets to each client of the device. These query packets may be filtered or restricted by per-user client rules. These query packets may also be tagged as high priority packets to speed their delivery. The device also suppresses the retransmission of MLD Reports (or IGMP joins).

FIG. 1 shows a network in which access points (APs) 100 are purpose-made digital devices, each containing a processor 110, memory hierarchy 120, and input-output interfaces 130. In one embodiment of the invention, a MIPS-class processor such as those from Cavium or RMI is used. Other suitable processors, such as those from Intel or AMD may also be used. The memory hierarchy 120 traditionally comprises fast read/write memory for holding processor data and instructions while operating, and nonvolatile memory such as EEPROM and/or Flash for storing files and system startup information. Wired interfaces 140 are typically IEEE 802.3 Ethernet interfaces, used for wired connections to other network devices such as switches, or to a controller. Wireless interfaces 130 may be WiMAX, 3G, 4G, and/or IEEE 802.11 wireless interfaces. In one embodiment of the invention, APs operate under control of a LINUX operating system, with purpose-built programs providing host controller and access point functionality. Access points 100 typically communicate with a controller 400, which is also a purpose-built digital device having a processor 410, memory hierarchy 420, and commonly a plurality of wired interfaces 440. Controller 400 provides access to network 500, which may be a private intranet or the public internet.

Note that while the present invention is described in terms of an access point (AP), the required functionality may be embodied in a combined controller/AP.

Client devices 200 have similar architectures, chiefly differing in input/output devices; a laptop computer will usually contain a large LCD, while a handheld wireless scanner will typically have a much smaller display, but contain a laser barcode scanner.

According to the present invention, an access point 100 passes traffic to and from clients 200 to other services such as controller 400 and services present on network 500.

It is important to note that according to WLAN standards, such as IEEE 802.11 standards, unicast packets are always acknowledged by the receiver, and retransmitted when errors in delivery are detected, while multicast packets are not acknowledged, and are sent at very low data rates to increase the probability of reliable reception by multiple clients. As an example in an IEEE 802.11n network, multicast packets are sent at as low as 24 Mbps rate, while unicast packets sent on the same IEEE 802.11n network could be sent at rates as high as 300 Mbps.

It is known in the art to convert multicast data packets to unicast at the wireless access point. Depending on the number of subscribers for a particular multicast stream, it may take less air time to transmit one unicast packet at, for example, the 11n data rate of 300 Mbps to each subscriber to the multicast stream than to transmit one multicast packet at the much slower 24 Mbpss data rate.

According to the present invention, AP 100 deals with MLD membership control packets such as MLD queries and MLD reports/joins. By definition, an AP 100 has a list of all client devices 200 associated with the AP.

According to the present invention, when AP 100 receives an MLD query from an upstream source such as multimedia server 300 or controller 100, it converts that MLD query from multicast to unicast form, and transmits an MLD query to all clients 200 of AP 100. In different embodiments, such upstream MLD queries may be subject to per-client firewall rules or filtering. As an example, rules associated with some clients may not permit multicast traffic, or may limit multicast traffic. Optionally, when the MLD query is converted from multicast to unicast, it may be tagged as a high-priority packet to speed the delivery of the unicast MLD query to AP clients 200.

Optionally the query can be converted to MLDv1 by clearing the multicast address list. Forwarding the MLD query as an MLDv1 query forces clients to switch to MLDv1. Use of MLDv1 allows in particular upstream switches reliant on older MLDv1 protocols to successfully collect downstream membership information.

As is known to the art, client devices 200 on reception of an MLD query for a stream the client is interested in will respond with an MLD join. These MLD join responses, which are multicast, are typically flooded to all L2 clients, those client devices associated to the same SSID on the AP to which the client is associated. This query/response flooding may occupy significant airtime if a large number of client devices 200 are involved. Suppressing the local flooding of these local MLD join responses saves airtime.

Another issue with flooding of MLD joins is that some clients 200 will suppress their own join response if they see another join response for the same multicast stream. While such behavior may be beneficial in reducing air time, it also results in hidden clients, such that AP 100 does not have an accurate list of clients for the multicast streams it is handling.

According to the present invention, when AP 100 receives an MLD join from a client 200, this MLD join is forwarded upstream, but is not flooded back to all clients of AP 100. This forces all interested clients 200 to send individual MLD join responses, resulting in accurate membership information held by AP 100.

Optionally, when a client 200 associates to AP 100, the AP can send a MLD query as unicast, requesting to join all interested multicast group, with a short response time, for example 10 ms. Unlike IGMP in IPV4 network, MLD protocol allows setting of response time in the granularity of milliseconds, instead of 100 s of milliseconds. Directing this unicast query directly to the client triggers the client to reply immediately with MLD joins for all interested multicast groups. These MLD joins are forwarded upstream by AP 100. Also, when a client hops from one AP to another AP during roaming, these joins help APs like AP 100 and all the upstream routers to learn the membership immediately. All routers and switches will start forwarding traffic towards client 200 without waiting for the next periodic query from one of the upstream router(s) in the network. As no other network entity apart from the client knows about the query, this method avoids any other disturbance to the network. The MLD Query can be sent as an MLDv1 Query for the responding Join to be MLDv1. Client 200 will immediately fallback to MLD v1 without any delay, instead of switching modes only on the next periodic query. Thus, even if the Query originated by multimedia server is MLDv2, the Join replies will be MLDv1, allowing any switches and/or controllers, such as controller 400, to successfully snoop older MLDv1 control packets.

According to another embodiment of the present invention, AP 100 deals with IGMP membership control packets such as IGMP queries and IGMP joins. By definition, an AP 100 has a list of all client devices 200 associated with the AP.

According to the present invention, when AP 100 receives an IGMP query from an upstream source such as multimedia server 300 or controller 100, it converts that IGMP query from multicast to unicast form, and transmits an IGMP V2 query to all clients 200 of AP 100. In different embodiments, such upstream IGMP queries may be subject to per-client firewall rules or filtering. As an example, rules associated with some clients may not permit multicast traffic, or may limit multicast traffic. Optionally, when the IGMP query is converted from multicast to unicast, it may be tagged as a high-priority packet to speed the delivery of the unicast IGMP query to AP clients 200.

Forwarding the IGMP query as an IGMPv2 query forces clients to switch to IGMPv2. Use of IGMPv2 allows in particular upstream switches reliant on older IGMPv2 protocols to successfully collect downstream membership information.

As is known to the art, client devices 200 on reception of an IGMP query for a stream the client is interested in will respond with an IGMP join. These IGMP join responses, which are multicast, are typically flooded to all L2 clients, those client devices associated to the same SSID on the AP to which the client is associated. This query/response flooding may occupy significant airtime if a large number of client devices 200 are involved. Suppressing the local flooding of these local IGMP join responses saves airtime.

Another issue with flooding of IGMP joins is that some clients 200 will suppress their own join response if they see another join response for the same multicast stream. While such behavior may be beneficial in reducing air time, it also results in hidden clients, such that AP 100 does not have an accurate list of clients for the multicast streams it is handling.

According to another embodiment of the present invention, when AP 100 receives an IGMP join from a client 200, this IGMP join is forwarded upstream, but is not flooded back to all clients of AP 100. This forces all interested clients 200 to send individual IGMP join responses, resulting in accurate membership information held by AP 100.

Optionally, when AP 100 forwards IGMP Queries from an upstream node such as multimedia server 300 to a client 200 of AP 100, the AP converts this packet to a unicast packet containing an IGMPv2 formatted query, with a short response time, for example 100 ms. Directing this unicast query directly to the client triggers the client to reply with IGMP joins for all interested multicast groups. These IGMP joins are forwarded upstream by AP 100. Since the IGMP Query was converted to an IGMPv2 Query, the responding Join will also be IGMPv2. Thus, even if the Query originated by multimedia server is IGMPv3, the Join replies will be IGMPv2, allowing any switches and/or controllers, such as controller 400, to successfully snoop older IGMPv2 control packets.

The present invention may be realized in hardware, software, or a combination of hardware and software. The present invention may be realized in a centralized fashion in one computer system such as AP 100, or in a distributed fashion where different elements are spread across several interconnected computer systems. A typical combination of hardware and software may be a controller or access point with a computer program that, when being loaded and executed, controls the device such that it carries out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

I claim:

1. A method of handling a Multicast Listener Discovery (MLD) traffic in an access point (AP) connected to a digital network comprising:
receiving, by the AP, an MLD Query directed to at least one client of the AP;
applying per-client filtering rules to the received MLD Query and only processing the received MLD Query if allowed by the filtering rules;
converting, by the AP, the MLD Query, from multicast to unicast form;
marking the converted MLD Query as high priority prior to sending the converted MLD Query; and
sending, by the AP, the converted MLD Query to the at least one client as a unicast packet;
wherein the converting of the MLD Query from multicast to unicast form includes converting the MLD Query to an MLDv1 Query by clearing the multicast address list.

2. The method of claim 1 further comprises identifying all clients associated with the AP and sending the converted MLD Query to each of the identified clients associated with the AP.

3. A non-transitory machine readable medium having a set of instructions stored in a memory, which when executed on an access point (AP) causes a set of operations to be performed comprising:
receiving a Multicast Listener Discovery (MLD) Query directed to a client of the AP;
applying per-client filtering rules to the received MLD Query and only processing the received MLD Query if allowed by the filtering rules;
converting the MLD Query, from multicast to unicast form;
marking the converted MLD Query as high priority prior to sending the converted MLD Query; and
sending the converted MLD Query to the client as a unicast packet; wherein the converting of the MLD Query from multicast to unicast form includes converting the MLD Query to an MLDv1 Query by clearing the multicast address list.

4. The method of claim 2, wherein the sending of the converted MLD Query comprises transmitting the MLD Query in unicast form to all clients associated with the AP.

5. The method of claim 1, wherein the MLD Query is a membership control packet being distinct from a data packet.

6. The non-transitory machine readable medium of claim 3, wherein prior to converting the MLD Query, the operations performed further comprise identifying all clients associated with the AP.

7. The non-transitory machine readable medium of claim 6, wherein the sending of the converted MLD Query comprises transmitting the MLD Query in unicast form to all clients associated with the AP.

8. A method of handling an Internet Group Management Protocol (IGMP) traffic in an access point (AP) connected to a digital network comprising:
receiving, by the AP, an IGMP Query directed to a client of the AP;
applying per-client filtering rules to the received IGMP Query and only processing the received IGMP Query if allowed by the filtering rules;
converting, by the AP, the IGMP Query; and
marking of the converted IGMP Query as high priority prior to sending the converted IGMP Query; and
sending, by the AP, the converted IGMP Query to the client as a unicast packet; wherein the converting of the IGMP Query from multicast to unicast form includes converting the MLD Query to an IGMPv2 Query by clearing the multicast address list.

9. The method of claim 8, wherein prior to converting the IGMP Query, the method further comprises identifying all clients associated with the AP.

10. The method of claim 9, wherein the sending of the converted IGMP Query comprises transmitting the MLD Query in unicast form to all clients associated with the AP.

11. The method of claim 8, wherein the IGPM Query is a membership control packet being distinct from a data packet.

12. A non-transitory machine readable medium having a set of instructions stored in a memory, which when executed on an access point (AP) causes a set of operations to be performed comprising:
receiving an Internet Group Management Protocol (IGMP) Query directed to a client of the AP;
applying per-client filtering rules to the received IGMP Query and only processing the received IGMP Query if allowed by the filtering rules;
converting the IGMP Query;
marking the converted IGMP Query as high priority prior to sending the converted IGMP Query; and
sending the converted IGMP Query to the client as a unicast packet; wherein the converting of the IGMP Query from multicast to unicast form includes converting the IMGP Query to an IGMPv2 Query by clearing the multicast address list.

13. The non-transitory machine readable medium of claim 12, wherein prior to converting the IGMP Query, the operations performed further comprise identifying all clients associated with the AP.

14. The non-transitory machine readable medium of claim 13, wherein the sending of the converted IGMP Query comprises transmitting the IGMP Query in unicast form to all clients associated with the AP.

15. The non-transitory machine readable medium of claim 12 further comprising:
suppressing local flooding of a IGMP Join sent by the client in response to the IGMP Query.

* * * * *